United States Patent

Grosse-Puppendahl et al.

[11] Patent Number: 5,102,489
[45] Date of Patent: Apr. 7, 1992

[54] METHOD OF COVULCANIZING POLYESTERS AND EP(D)M RUBBERS

[75] Inventors: Thomas Grosse-Puppendahl, Haltern; Friedrich-Georg Schmidt, Muenster; Hans Jadamus, Marl, all of Fed. Rep. of Germany

[73] Assignee: Huels Aktiengesellschaft, Marl, Fed. Rep. of Germany

[21] Appl. No.: 446,673

[22] Filed: Dec. 6, 1989

[30] Foreign Application Priority Data

Dec. 22, 1988 [DE] Fed. Rep. of Germany ....... 3843225

[51] Int. Cl.$^5$ .................. B29C 35/02; B29C 65/02
[52] U.S. Cl. ................ 156/307.1; 156/308.2; 264/236; 264/263; 264/331.19; 264/347; 428/424.2
[58] Field of Search ............. 264/347, 216, 331.19, 264/263, 236, 265; 156/331.4, 331.7, 307.1, 308.2, 304.1, 304.6; 428/521, 424.8, 423.9, 424.2; 525/131, 123, 232

[56] References Cited

U.S. PATENT DOCUMENTS

| | | | |
|---|---|---|---|
| 3,382,138 | 5/1968 | Barth et al. | 428/423.9 |
| 4,365,000 | 12/1982 | Muller et al. | 156/331.4 |
| 4,371,411 | 2/1983 | Honda et al. | 264/347 |
| 4,535,003 | 8/1985 | Ogawa et al. | 427/207.1 |
| 4,552,816 | 11/1985 | Spahic et al. | 156/331.7 |
| 4,666,782 | 5/1987 | Tada et al. | 428/424.8 |
| 4,704,176 | 11/1987 | Botzman | 264/265 |
| 4,800,120 | 1/1989 | Jadamus et al. | 420/521 |
| 4,808,665 | 2/1989 | Patel et al. | 525/232 |
| 4,835,063 | 5/1989 | Jadamus et al. | 428/521 |
| 4,855,362 | 8/1989 | Muse, Jr. et al. | 525/232 |
| 4,921,762 | 5/1990 | Jodamus et al. | 428/521 |

FOREIGN PATENT DOCUMENTS 62-191119 8/1987 Japan .................. 264/216

Primary Examiner—Jeffery Thurlow
Assistant Examiner—Mathieu Vargot
Attorney, Agent, or Firm—Oblon, Spivak, McClelland, Maier & Neustadt

[57] ABSTRACT

Direct adhesion between a body of a thermoplastic material and a rubber mass by covulcanization is achieved by bringing a rubber body constituted of the components:

- 100 parts by weight of an EP(D)M rubber functionalized with carboxyl groups;
- 100-300 parts by weight filler(s);
- 1-10 parts by weight peroxide-type vulcanizing agent;
- 0-4 parts by weight vulcanization activators; and optionally plasticizers, in contact with a body of a thermoplastic material constituted of 30-100 wt. % of a reaction product of a thermoplastic polyester and a polyisocyanate;
- 1-50 wt. % of a reinforcing material; and
- 0-20 wt. % of additives.

10 Claims, No Drawings

METHOD OF COVULCANIZING POLYESTERS AND EP(D)M RUBBERS

BACKGROUND OF THE INVENTION

1. Field of the Invention

The invention relates to a method of producing chemical adhesion between moldable compounds based on polyesters and EP(D)M rubbers containing carboxyl groups, and to composite or bonded materials thereby produced.

2. Description of the Background

In many cases, not all the properties desired in a given product can be contributed by a single material. Such inconsistent combinations of properties are, e.g., strength along with rubber-like elasticity, or high hardness and rigidity along with non-skid properties (traction).

Composite materials comprised of rigid thermoplastic moldable compounds and rubber-like elastic molding compounds are customarily held together by adhesive bonding, screwing, riveting, or mechanical coupling by form-interlocking means. Recently, interesting methods have been developed for producing direct chemical adhesion between certain rubbers and molding compounds based on polyphenylene ethers (PPEs) (see German OS 36 02 705, and German Patent App. P 37 39 891.0).

The adhesion values achieved are substantial. Now that means are available for producing such composite or bonded materials, it would be desirable to also produce composites or bonded materials, the thermoplastic component of which has not only high shape retention when heated, but also good solvent resistance, good weatherability, and outstanding sliding friction properties.

It should be mentioned that unpublished German Patent App. P 38 18 151.7 teaches a method of producing direct chemical adhesion between aliphatic polyamides and rubbers which contain carboxyl groups. This bonded system is distinguished by solvent resistance and weatherability.

Although it is known that the method referred to above is tied to certain critical parameters, basically it is possibly conceivable to replace the PPEs with other thermoplastics which are known to better satisfy the requirements described above. However, even though certain materials, e.g. polyesters, may be known to satisfy these requirements, under the process conditions recognized as essential, they do not produce sufficient adhesion (see Comparison Examples, infra). Accordingly, based on the state of the art, it did not seem possible to produce direct chemical adhesion between thermoplastic polyesters and rubbers, a need for which continues to exist.

SUMMARY OF THE INVENTION

Accordingly, one object of the present invention is to provide a method of bonding a body of rubber to a molding compound of a polyester.

Briefly, this object and other objects of the present invention as hereinafter will become more readily apparent can be attained in a method of producing direct chemical adhesion between a body of a thermoplastic material and a mass of rubber by bringing a rubber mass constituted of the components: 100 parts by weight EP(D)M rubber functionalized with carboxyl groups, 100-300 parts by weight of a filler(s), 1-10 parts by weight of a peroxide vulcanizing agent, 0-4 parts by weight of a vulcanization activator and optionally plasticizers, in contact with a body of a thermoplastic material constituted of 30-100 wt. % of a reaction product of a thermoplastic polyester and a polyisocyanate, 0-50 wt. % of a reinforcing material and 0-20 wt. % of additives, and then covulcanizing the body and mass in contact with each other.

DETAILED DESCRIPTION OF THE PREFERRED EMBODIMENTS

The terminal groups on the polyester component of the bonded structure of the present invention are preferably primarily hydroxyl groups. The polyester may be, in particular, polybutylene terephthalate (PBT), polyethylene terephthalate (PET), and/or copolyesters of these with isophthalic acid, dodecanedicarboxylic acid, polyoxytetramethylene, or 1,4-di-hydroxymethylcyclohexane. The polyester may be, in particular, reacted with a polyisocyanate in an amount such that the ratio of the reactive isocyanate functional groups to the hydroxyl terminal groups of the polyester is greater than 1.0, preferably greater than 1.1.

The covulcanization of the thermoplastic and the rubber is preferably carried out at a temperature between 140 and 200 ° C., with a duration 2-30 min; particularly preferably between 150° and 180 ° C., with a duration of 10-20 min.

The method of the present invention is distinguished by the following advantages:

i) Direct chemical adhesion is preferably achieved within several minutes.
ii) The polyesters used in the direct chemical adhesion system are distinguished by high thermal shape stability, good solvent resistance, and outstanding sliding friction properties, and can be used outdoors without problems.
iii) The composite is so strong that when tested the cohesion failure is in the rubber, and not at the phase boundary,
iv) Notable advantages over the direct chemical adhesion system described in German Patent App. P 38 18 151.7 are improved sliding friction properties and lower water uptake.

The components which make up the polyester structural component are (a) thermoplastic polyesters, (b) polyisocyanates, (c) reinforcing materials, and (d) additives.

Suitable materials for use as the thermoplastic polyesters (a) are linear, partially crystalline homo and copolyesters based on aromatic dicarboxylic acids with 8-14 carbon atoms and (polyether-)diols.

Suitable aromatic dicarboxylic acids include phthalic, iso-, and terephthalic acid. (Cyclo)aliphatic dicarboxylic acids with up to 12 carbon atoms may replace up to 20 mol % of the aromatic dicarboxylic acid. Examples of such replacement acids are cyclohexane-1,4-dicarboxylic acid, adipic acid, sebacic acid, azelaic acid, and decanedicarboxylic acid. Suitable diol reactants include diols of the formula $HO-(CH_2)_n-OH$ such as ethylene glycol, 1,3-propanediol, 1,4-butanediol, and 1,6-hexanediol and methylation products of these alcohols such as, e.g. 1,2-propanediol; neopentyl glycol; 1,4-dihydroxymethylcyclohexane; and poly(oxyalkylene)-diols having a molecular weight up to 3,000, e.g. polyoxyethylene diol and polyoxytetramethylene diol.

In the case of the poly(oxyalkylene)diols, preferably the polyester is a block copolymer, with the poly(oxyalkylene)diol portion of the polyester being in the range 4-40 wt. %, preferably 10-35 wt. %. Preferred thermoplastic polyesters include polybutylene terephthalate (PBT), polyethylene terephthalate (PET), and copolyesters of these polyesters with dodecanedicarboxylic acid, and also polyoxytetramethylene (Hytrel ®), 1,4-di-hydroxymethyl-cyclohexane, isophthalic acid, etc. (see, e.g., Eur. OS 0 248 263, p. 5, lines 13 ff.). The thermoplastic polyesters are prepared in known fashion by transesterification or esterification of the dicarboxylic acid components with subsequent polycondensation (see 1961, "Polymer Chemistry", pub. Interscience, New York, pp. 111-127; 1973, "Kunststoffhandbuch", Vol. VIII, pub. C. Hanser Verlag, Munich; and 1966 J. Polym. Sci., Part Al, (4):1851-1859). Preferably the polyesters have viscosity indices J (determined according to the procedure described in DIN 16 779, Part 2) of 80-240 cc/g, and their end groups are primarily hydroxyl groups. They may be modified to increase impact strength. That is, they may contain up to 10% of an impact strength enhancer such as an EP(D)M rubber.

Suitable polyisocyanates (b) include di- and higher functional isocyanates, particularly, aromatic and cyclo-)aliphatic isocyanates with up to 20 carbon atoms such as 1.4-phenylenediisocyanate, 2,4-toluylenediisocyanate, 1,5-naphthalenediisocyanate, hexamethylenediisocyanate, and isophoronediisocyanate (IPDI); blocked polyisocyanates; and isocyanate oligomers such as uretdiones and isocyanurates.

Preferred is a trimeric polyisocyanate based on the cycloaliphatic isophoronediisocyanate (IPDI).

The reaction product of the thermoplastic polyester (a) and the polyisocyanate (b) is obtained by direct reaction of the two components at 230°-300 ° C., preferably 250°-270 ° C. The ratio of the amounts of the two components should be adjusted such that for each OH group of the polyester, there is at least one reactive isocyanate group which can react with it.

Suitable materials as reinforcing agents (c) are fibers, especially glass or carbon fibers.

The thermoplastic may also contain other additives (d) such as processing-aid additives, blowing agents, carbon black, graphite, metal flakes, zinc sulfide; and particularly impact strength enhancers, stabilizers, and pigments such as titanium dioxide.

The rubber formulation used in the inventive method is comprised of a carboxyl-group-containing EP(D)M rubber, filler(s), a peroxide-type vulcanization system, and possibly plasticizers such as, e.g., softening oils in an amount of up to 150 parts by weight.

The rubber component is produced in known fashion by carboxylation of EP(D)M rubber with unsaturated acids or acid derivatives, for example maleic acid or maleic anhydride (see, e.g., U.S. Pat. No. 4,010,223). It is also possible to produce these rubbers by copolymerization with unsaturated acids such as acrylic acid.

EP(D)M rubbers ar rubbers which are manufactured by polymerization of a mixture of ethylene and propylene and possibly a diene, in the presence of a Ziegler-Natta catalyst such as diethylaluminum chloride.

EPDM rubbers are produced by polymerization of a mixture of ethylene in the amount of >25%, propylene in the amount of >25 wt. %, and an unconjugated diene such as bicyclo(2,2,1)heptadiene, 1,4-hexadiene, dicyclopentadiene, and especially 5-ethylidenenorbornene, in the amount of 1-10%, preferably 1-3%.

Suitable EPM rubbers include products of the firm Exxon sold under the trade name Exxelor VA 1803 (trademark applied for). A suitable EPDM rubber is, e.g., maleic anhydride modified AP "Versuchsprodukt X 4496", supplied by Bunawerke Huels GmbH, D-4370 Marl, FHG.

Suitable fillers include any of the fillers customarily used in EP(D)M rubbers, preferably carbon black, silicic acid, aluminum silicates, calcium carbonate, zinc oxide, stearic acid, and mixtures thereof.

The vulcanization system employed according to the invention is comprised of a vulcanizing agent and possibly a vulcanization activator. Suitable peroxide-type vulcanizing agents are those known to persons skilled in the art, e.g., 2,5-dimethyl-2,5-di-tertbutylperoxyhexane, dicumyl peroxide, 4,4-di-tertbutylperoxy-n-butyl valerate, 1,1-di-tert-butylperoxy-3,3,5-trimethylcyclohexane, and bis(tert-butylperoxyisopropyl)benzene. Details of the use of peroxide-type vulcanizing agents may be found in the company brochure of the firm Akzo-Chemie, "Rubbery Chemical Crosslinking Peroxides", issued 1985.

Examples of suitable vulcanization activators include triallyl cyanurate (TAC) and acrylates such as ethylene glycol dimethacrylate (EDMA) and the trimethacrylate of 2,2-di-hydroxymethyl-1-butanol (TRIM). Preferred is TAC and/or EDMA.

The composite molded parts can be produced from the respective rigid and rubber-elastic molding compounds in a one- or two-stage process.

In the two-stage process, a molded part is produced from the thermoplastic by means of pressing, injection molding, or extruding. The rubber mass, which may be preformed, is added and the rubber is then subject to vulcanization conditions. Contact of the rubber with the rigid molded piece may be by pressing, injection molding, or extruding. The selection of the rubber, as to its viscosity in the mass, depends on the forming process to be employed.

In the two-stage injection molding process, the procedure is similar to that when producing two-color injection-molded parts in a two-stage process. The inserted piece is a thermoplastic molded piece. The cylinder and screw of the injection molding machine are configured in the known fashion for processing rubbers, and the machine is heatable to the vulcanization temperature.

The optimum covulcanization conditions depend on the vulcanization system and the shape of the molded piece.

Suitable machine temperatures are between 140° and 200 ° C., preferably between 150° and 180 ° C. When polyester materials with low shape retention when subjected to heat are used, temperatures in the lower part of the indicated range are selected. Vulcanization time is between 3 and 30 min, preferably between 10 and 20 min.

In the two-stage addition and vulcanization process employing extrusion, a,.e g , thermoplastic profile produced in the first stage, which profile may be, e.g., a tube, is sheathed with the rubber mass and is vulcanized, possibly under pressure. Corresponding techniques are used to produce plates, nonwoven fabrics (felts and the like), woven fabrics, and cables.

In the one-stage injection molding process, the procedure is similar to that when producing two-color injection-molded parts in a one-stage process. One injection molding machine is used to process the thermoplastic, and the second injection molding machine is used to process the rubber. The apparatus is heated to the prescribed vulcanization temperature, which should be below the setting temperature of the thermoplastic.

The following are examples of objects which can be produced from the covulcanized materials: rubber-coated tubes and flanges; couplings for rigid tubes and/or flexible tubing, gaskets or gasket elements, construction elements which absorb impact or radiation, or spring elements; vibration damping pieces, or reinforced rubber profile products; conveyor belts, drive belts, pressure rollers for videotape and audio tape recorders/players; seals, particularly shaft packing rings; wheels; discs for couplings and brakes; membranes; pistons with sealing rings; reinforced bellows or siphons; pump housings and pump valves; polyester reinforced rubber tubing; and other such items.

Having generally described this invention, a further understanding can be obtained by reference to certain specific examples which are provided herein for purposes of illustration only and are not intended to be limiting unless otherwise specified.

1. Polyester-containing molding compounds

Examples 1.1 to 1.5 and Comparison Examples A to C:

The individual components were mixed in a double-screw kneader-mixer at 270° C. in the proportions given in the following table:

TABLE 1

| Composition of components in the Examples: | | | | | | | | |
|---|---|---|---|---|---|---|---|---|
| | A | B | C | 1.1 | 1.2 | 1.3 | 1.4 | 1.5 |
| VESTO-DUR ® 1000[1] | 100 | 99 | — | 98 | 96.5 | 95.2 | 90.9 | — |
| IPDI T 1890[2] | — | 1 | — | 2 | 3.5 | 4.8 | 9.1 | 8 |
| HYTREL ® 5556[3] | — | — | 100 | — | — | — | — | 92 |

KEY to Table "1"
[1]Vestodur ® 1000: A low-viscosity PBT produced in known fashion by polycondensation. The product is available from Huels AG, of D-4370 Marl, FRG. Additional properties are given in the product information brochure, "Vestodur", dated March, 1985.
[2]IPDI T 1890: A multifunctional trimeric IPDI available from Huels AG, of D-4370 Marl, FRG. The properties of the product are given in the product information brochure, "Polyisocyanate IPDI T 1890", dated June, 1985.
[3]Hytrel ® 5556: A block copolyester available from DuPont, of Wilmington, Delaware, which is produced with the use of polyoxytetramethylenediol. The properties of the product are given in the product information brochure, "Hytrel ® - Elastischer Konstruktionswerkstoff", dated October, 1986.

TABLE "b"

Properties of Molded Parts
According to Example 1.1 to 1.5 and Comparison Examples A, B and C

| Examples | A | B | C | 1.1 | 1.2 | 1.3 | 1.4 | 1.5 |
|---|---|---|---|---|---|---|---|---|
| MVI[2] (cm$^3$/10 min) 2.16 kg/265° C. DIN 53 735 | 80 | 49 | — | 29 | 15 | 52 | 168 | — |
| Vicat Softening Temperature Method B (°C.) DIN 53 460 | 180 | 180 | — | 178 | 176 | 167 | 159 | — |
| Modulus of Elasticity (N/mm$^2$) Tensile Test DIN 53 457 | 2585 | 2720 | 230 | 2860 | 2550 | 2460 | 2420 | 260 |
| Notched-bar Impact strength 23° C. (kJ/m$^2$) | 3.1 | 3.0 | [1] | 3.2 | 3.9 | 4.0 | 3.2 | [1] |
| DIN 53 453 −40° C. | 2.9 | 3.0 | [1] | 3.2 | 3.9 | 4.0 | 3.2 | [1] |
| Modulus of Elasticity Bending Test DIN 53 457 | 2500 | 2560 | 207 | 2690 | 3100 | 2710 | 2590 | — |

[1]Breakage did not occur
[2]MVI (melt volume index) is a measure of fluidity.

2. Rubbers 2.1. Exxelor ® VA 1803: The maleic anhydride modified EPM rubber is supplied by the firm Exxon Chemicals, Wilmington, Del. The properties of the product are given in the technical information brochure, "Exxelor VA", dated Mar. 1, 1988.

2.2. Versuchsprodukt X 4496: The product is produced by maleic anhydride modification of BUNA AP 437 (EPDM). The properties are given in the product information brochure, "Buna ® AP", dated December 1980.

To demonstrate direct chemical adhesion, test bodies were manufactured: A plastic plate was produced from the thermoplastic polymer, according to the procedure described in DIN 53 531, Part 1, and one third of the plate was covered with a Teflon film. A rubber sheet cut to size was applied to the plate, and bonding was accomplished by the pressing method. Sample bodies were then cut out by sawing, which bodies had a width of 25 mm.

The rubber formulations are shown in Table 2, infra. For comparison purposes, tests with sulfur-vulcanized rubber systems were also carried out (Examples 3.2 and 3.4). The compositions of the polyester-containing molding compounds are shown in Table 1. The properties of the composites or bonded materials of the present invention are shown in Table 3.

TABLE 2

Components of the rubber formulations 3.1 to 3.4 (parts by weight).

| Example | 3.1 | 3.2 | 3.3 | 3.4 |
|---|---|---|---|---|
| Rubber 2.1 | 100 | 100 | — | — |
| Rubber 2.2 | — | — | 100 | 100 |
| Zinc Oxide[1] | 5 | 5 | 10 | 5 |
| Aluminum Silicate[2] | — | — | 140 | 104 |
| Juraperle 10 H[3] | — | — | 60 | 60 |
| Oil[4] | 60 | 60 | 50 | 50 |
| VULKANOX ® HS[5] | 1.5 | 1.5 | 1.5 | 1.5 |
| DUREX ® 0[6] | 100 | 100 | — | — |
| TAC[7] | 1 | — | 1 | — |
| Perkadox 14/40[8] | 7.5 | — | 7.5 | — |
| Stearic Acid | — | 1 | — | 1 |
| VULKANOX ® DDA[9] | — | 1.5 | — | 1.5 |
| VULKACIT ® LDM[10] | — | 1.5 | — | 1.5 |
| VULKACIT ® P extra N[11] | — | 0.8 | — | 0.8 |
| VULKACIT ® Mercapto[12] | — | 1.0 | — | 1.0 |
| TMTD 80[13] | — | 1.0 | — | 1.0 |
| Sulfur | — | 0.8 | — | 0.8 |

[1] Zinc oxide (purity > 99%, particle size 0.8-1.0 mm).
[2] Aluminum silicate (comprising china clay, trade name Polestar ® 200 R, supplied by the firm ECC International, St. Austell, Cornwall, GB; properties available from brochure supplied by ECC Intl.);
[3] Juraperle 10 H (a filler supplied by the company Wingersberg Fuellstoff und Kreidewerk GmbH, D-5000 Koeln-Bayental, FRG).
[4] Oil (a paraffinic oil, Sunpar 150, supplied by the firm Sunoil Belgien LV, Antwerp, Belgium);
[5] Vulkanox ® HS (an antiaging agent, supplied by Bayer AG, D-5090 Leverkusen, FRG, and comprised of 2,2,4-trimethyl-1,2-dihydroquinoline);
[6] Durex ® 0 (a moderately reinforcing gas carbon black, supplied by the firm Degussa, D-6450 Hanau, FRG);
[7] TAC (triallyl cyanurate, supplied by Degussa, D-6450 Hanau, FRG):
[8] Perkadox 14/40 (supplied by Akzo-Chemie, 3800 AZ-Amersfoort, Netherlands);
[9] Vulkanox ® DDA (an antiaging agent, supplied by Bayer AG, and comprised of a styrenized diphenylamine (SDPA));
[10] Vulkacit ® LDM (an accelerator, supplied by Bayer AG, and comprised of zinc dibutyl dithiocarbamate);
[11] Vulkacit ® Pextra N (an accelerator, supplied by Bayer AG, and comprised of zinc ethyl phenyl dithiocarbamate);
[12] Vulkacit ® Mercapto (an accelerator, supplied by Bayer AG, and comprised of mercaptobenzothiazole);
[13] TMTD 80 (tetramethylthiuram disulfide-supplied under the trade name Rhenogram ® TMTD 80, by Rheinchemie, D-6800 Mannheim, FRG).

4. Bonded materials

TABLE 3

Properties of the inventive bonded materials:

| Example | Rubber | Polyester Number | Vulcanization Temperature in °C | Vulcanization Time in Min | Separation Force in N/mm |
|---|---|---|---|---|---|
| 4.1 | 3.1 | 1.1 | 175 | 15 | 7.5 |
| 4.2 | 3.1 | 1.2 | 175 | 15 | 10.1 |
| 4.3 | 3.1 | 1.3 | 165 | 20 | 10.6 |
| 4.4 | 3.1 | 1.4 | 160 | 25 | 9.2 |
| 4.5 | 3.1 | 1.5 | 160 | 25 | 11.1 |
| 4.6 | 3.3 | 1.3 | 165 | 20 | 14.4 |
| 4.7 | 3.3 | 1.5 | 160 | 25 | 11.7 |

In all the tests, separation occurred in the rubber layer (cohesion failure) and not at the interface between the plastic and the rubber.

No appreciable adhesion was achieved with sulfur-vulcanized rubber systems, i.e. the bond between rubber and polyester separated with minimal separation force, at the interface between the plastic and the rubber (see Comparison Tests D and E in Table 4).

TABLE 4

| Example | Rubber | Polyester Number | Vulcanization Temperature in °C | Vulcanization Time in Min | Separation Force in N/mm |
|---|---|---|---|---|---|
| D | 3.2 | 1.2 | 175 | 15 | 1.2 |
| E | 3.4 | 1.3 | 165 | 20 | 1.0 |

In another set of comparison examples, the rubbers 3.1 and 3.3 were added to the thermoplastic polyester which did not have polyisocyanate added to it, or had only a small amount of polyisocyanate. In these cases also, the bond could be separated with minimal force.

TABLE 5

| Example | Rubber | Polyester Number | Vulcanization Temperature in °C | Vulcanization Time in Min | Separation Force in N/mm |
|---|---|---|---|---|---|
| F | 3.1 | A | 180 | 10 | 2.1 |
| G | 3.1 | B | 180 | 10 | 5.5 |
| H | 3.3 | C | 160 | 25 | 3.2 |

Obviously, numerous modifications and variations of the present invention are possible in light of the above teachings. It is therefore to be understood that within the scope of the appended claims, the invention may be practiced otherwise than as specifically described herein.

What is new and desired to be secured by Letters Patent of the United States is:

1. A method of producing direct chemical adhesion between a molded body of a thermoplastic material and a rubber mass, by covulcanization in the presence of a vulcanization system, comprising:

contacting a rubber body comprised of the components:
100 parts by weight of an EP(D)M rubber functionalized with carboxyl groups;
100-200 parts by weight filler(s);
1-10 parts by weight of a peroxide-type vulcanizing agent;
0-4 parts by weight vulcanization activators; and optionally plasticizers, with said molded body of a thermoplastic material comprised of 30-100 wt. % of a reaction product of a thermoplastic polyester prepared by the esterification or transesterification of an aromatic dicarboxylic acid of 8-14 carbon atoms, wherein up to 20 mol % of the aromatic dicarboxylic acid may be substituted with a cycloaliphatic or aliphatic dicarboxylic acid of up to 12 carbon atoms, with an alkylene diol, neopentyl glycol, 1,4-dihydroxymethylcyclohexane or a poly(oxyalkylene) diol having a molecular weight up to 3,000 and a polyisocyanate in an amount such that for each OH group present in the polyester reactant, at least one reactive isocyanate group is provided to react with it;
0-50 wt. % of a reinforcing material; and
0-20 wt. % of additives, and
covulcanizing the bodies which are in contact with each other.

2. The method of claim 1, wherein a polyester is employed the end groups of which are primarily hydroxyl groups.

3. The method of claim 1, wherein the polyester is polybutylene terephthalate (PBT), polyethylene terephthalate (PET), or a copolyester of these polyesters with isophthalic acid, dodecanedicarboxylic acid, polyoxytetramethylene, or 1,4-hydroxymethylcyclohexane.

4. The method according to claim 1, wherein the thermoplastic polyester contains impact strength enhancers, stabilizers, and pigments.

5. The method of claim 1, wherein the rubber formulation contains, as filler(s), zinc oxide, calcium carbonate, silicic acid, stearic acid, carbon black, aluminum silicates, or combinations thereof.

6. The method of claim 1, wherein the rubber formulation additionally contains softening oils in the amount of up to 150 parts by weight.

7. The method of claim 1, wherein the covulcanization is carried out at a temperature between 140° and 200° C., for a duration of 2-30 min.

8. The method according to claim 8, wherein said covulcanization occurs at a temperature of 150°-180° C. for 10-20 min.

9. The method according to claim 1, wherein the EP(D)M rubber is prepared by the polymerization of greater than 25 wt. % ethylene, greater than 25 wt. % propylene and from 1-10 wt. % of an unconjugated diene.

10. The method according to claim 1, wherein said peroxide initiator is 2,5-dimethyl-2,5-di-t-butylperoxyhexane, dicumyl peroxide, 4,4-di-t-butylperoxy-n-butyl valerate, 1,1-di-t-butylperoxy-3,3,5-trimethylcyclohexane or bis(t-butylperoxyisopropyl benzene.

* * * * *